United States Patent [19]

Hansen

[11] Patent Number: 4,726,442

[45] Date of Patent: Feb. 23, 1988

[54] SIDE-STICK VEHICLE STEERING SYSTEM

[76] Inventor: Richard E. Hansen, P.O. Box 521, Prattville, Ala. 36067

[21] Appl. No.: 901,638

[22] Filed: Aug. 29, 1986

[51] Int. Cl.$^4$ .............................................. B62D 1/14
[52] U.S. Cl. ................................. 180/332; 74/388 PS
[58] Field of Search ................. 180/333, 78, 132, 332; 280/771; 74/496, 388 PS; 200/61.87, 61.88, 61.91

[56] References Cited

U.S. PATENT DOCUMENTS

| | | | |
|---|---|---|---|
| 781,989 | 2/1905 | Ball, Jr. ................................... | 74/496 |
| 1,748,041 | 2/1930 | Backhus ............................... | 180/333 |
| 1,953,954 | 4/1934 | Constable ............................ | 180/333 |
| 3,022,850 | 2/1962 | Bidwell ................................ | 180/333 |
| 4,040,499 | 8/1977 | Kestian et al. ...................... | 180/333 |
| 4,214,642 | 7/1980 | Dauvergne ...................... | 74/388 PS |
| 4,476,949 | 10/1984 | Patton .................................. | 180/333 |
| 4,527,656 | 7/1985 | Walbridge ........................... | 180/333 |

Primary Examiner—John J. Love
Assistant Examiner—Karin L. Ferriter
Attorney, Agent, or Firm—Anthony A. O'Brien

[57] ABSTRACT

A vehicle steering system includes a single handgrip mounted adjacent the driver's seat for pivotal displacement in a laterally extending plane. Interconnection structure provides a motion transmitting train between the handgrip and suitable power-assisted steering components in the engine compartment to regulate steering of a vehicle's wheels as the handgrip is laterally pivoted. The interconnection structure may include a plurality of serially-connected rotatable shafts, power-steering fluid control valves directly actuated by the handgrip or electrical switches controlled directly by the handgrip to regulate power-steering fluid valves disposed in the engine compartment.

5 Claims, 6 Drawing Figures

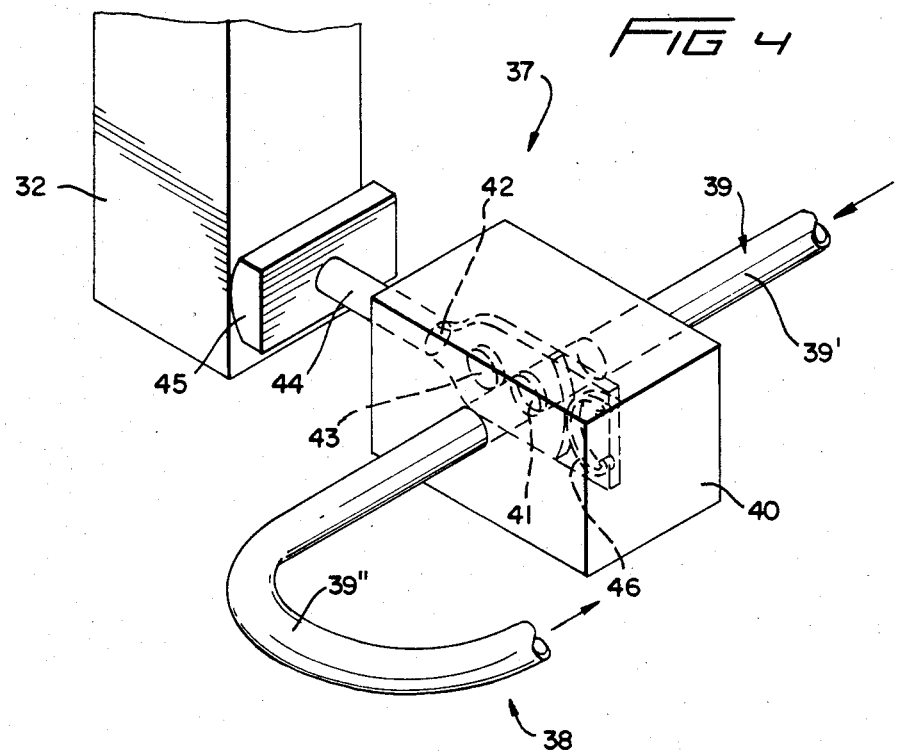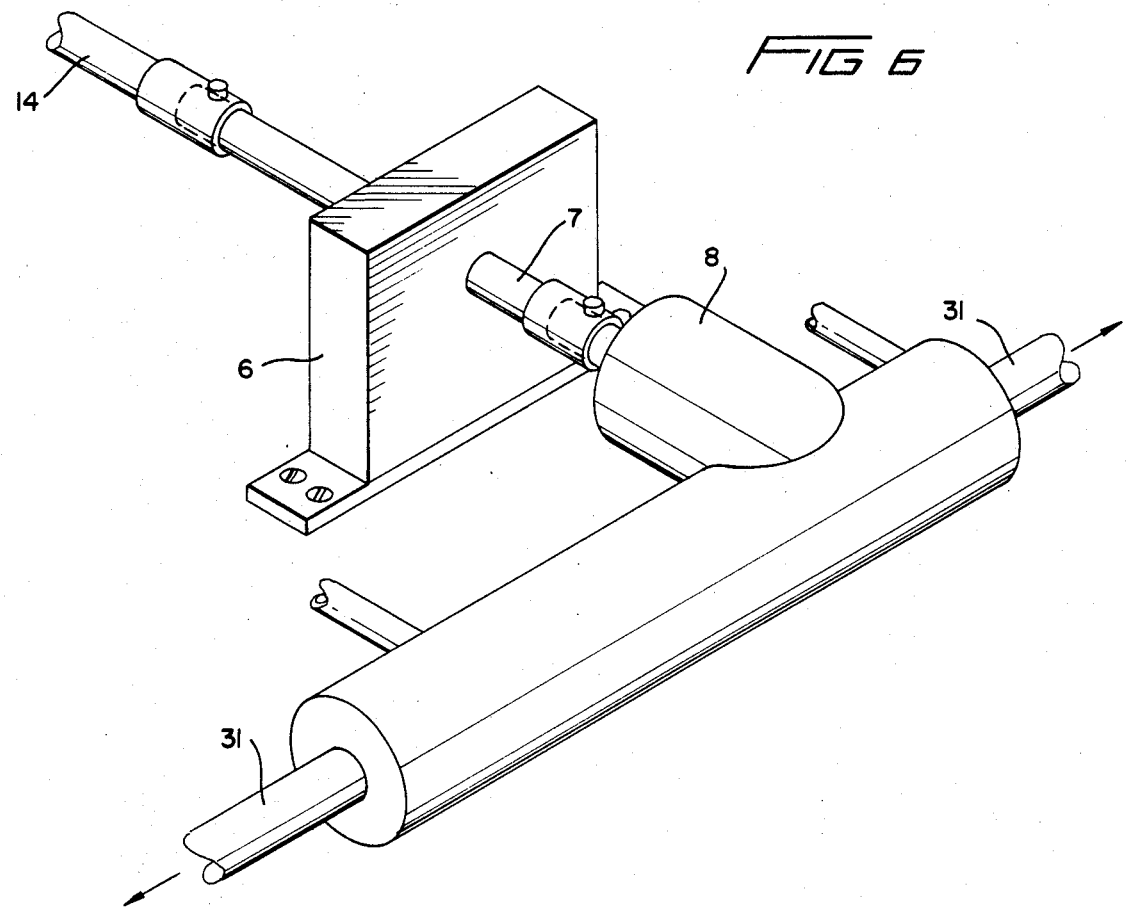

SIDE-STICK VEHICLE STEERING SYSTEM

This invention relates generally to vehicle steering systems, and more particularly, to an improved steering system operated by means of a side-mounted handgrip or stick.

BACKGROUND OF THE INVENTION

Shortly after the introduction of the automobile, the steering wheel was adopted as the conventional mechanism for controlling the vehicle's steering. To this date, a wheel remains as the control mechanism for regulating the actuation mechanism providing directional displacement to the front wheels of the vehicle. Numerous important improvements have been made during the years to the steering actuation mechanism itself, the most noteworthy of which may be considered the hydraulically actuated power-assist devices commonly referred to as power steering. Those changes that have been made to the steering control mechanism located within the passenger compartment have mostly been cosmetic changes as well as modifications as required by the U.S. National Highway Transportation Safety Administration. These latter changes include the requirement that steering wheels/shafts must be frangible or collapsible and exhibit limited rearward displacement in collisions. Even with these standards as mandated by the government, many deaths and injuries occur each year due to the present steering wheels and shafts, since, in any head-on collision of sufficient magnitude, the driver's chest area remains vulnerable to crushing and penetration during such accidents.

It thus follows that any vehicle steering system which would eliminate disposition of the steering wheel and its shaft from a position immediately in front of the driver will substantially enhance the safety aspects of motoring. U.S. Pat. No. 3,410,570 issued Nov. 12, 1968, to Brown illustrates an alternative arrangement for a vehicle steering wheel wherein a single transversely extending arm is substituted for the conventional wheel. This arm is in turn centrally attached to a crank member, the latter of which transmits directional displacement of the arm to a steering shaft leading to the vehicle steering actuation mechanism.

SUMMARY OF THE INVENTION

By the present invention, an improved steering system is provided wherein the driver regulates any suitable forwardly mounted steering actuation mechanism associated with the vehicle, by means of a single stick or handgrip located laterally of the driver's position. Preferably, this handgrip is mounted stop a console extending along the vehicle centerline. Manipulation of the handgrip in a sideways arcuate manner in a single, substantially vertical plane transmits this handgrip displacement to appropriate steering actuation mechanism positioned within the engine compartment. This transmission of control movements from the handgrip to the actuation mechanism may be accomplished through a mechanical motion transmitting train interconnecting the two mechanisms or alternatively, by hydraulic or electrical sub-systems. Regardless of the sub-system employed, it will be understood that the steering actuation mechanism itself may comprise any suitable well-known devices such as power-assisted rack-and-pinion mechanisms. To accommodate the steering capability should hydraulic failure occur in the power-assist device, continued steering of the vehicle will be possible, in the case of the mechanical interconnection, by the driver's application of additional force upon the handgrip. With the hydraulic or electrical interconnection, back-up means are provided which are automatically brought into play to enable continued operation of the power assist device of the actuation mechanism.

Accordingly, one of the objects of the present invention is to provide an improved vehicle steering system including a single handgrip stick mounted adjacent the driver's position, and manipulable in a lateral arcuate direction to control a vehicle's steering.

Another object of the present invention is to provide an improved vehicle steering system including a pivotal side stick operable to mechanically transmit, through substantially horizontal shafts, controlling motions to actuate the vehicle steering.

A further object of the present invention is to provide an improved vehicle steering system including a pivotally displaceable side stick in the passenger compartment and which transmits direction control signals to the vehicle steering mechanism by way of valved hydraulic lines extending from the side stick to the steering mechanism.

Still another object of the present invention is to provide an improved vehicle steering system including a pivotally displaceable side stick in the passenger compartment and which upon manipulation, regulates switches to electrically control the movement of hydraulic fluid associated with the vehicle's steering mechanism.

BRIEF DESCRIPTION OF THE DRAWINGS

FIG. 4 is a fragmentary view, in perspective, illustrating one alternative form of interconnection means for transmitting motion of the side-stick to the vehicle steering mechanism;

FIG. 6 is a partial perspective view illustrating direct mechanical connection as provided between the control mechanism of FIG. 1 and a typical steering actuation mechanism Similar reference characters designate corresponding parts throughout the several figures of the drawings.

DESCRIPTION OF THE PREFERRED EMBODIMENTS

Figure 1:
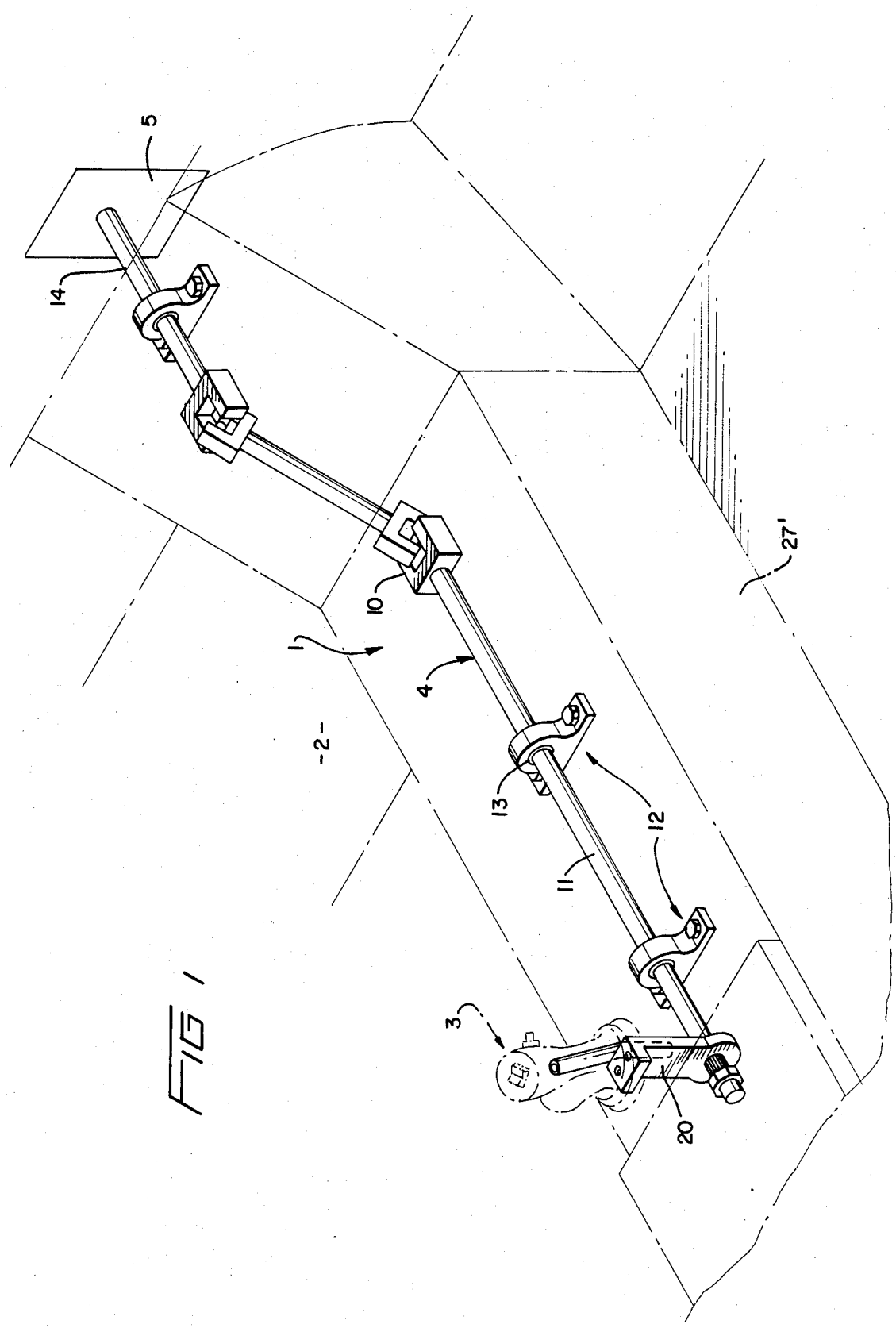
FIG. 1 is a perspective view of a steering control mechanism according to the present invention.

Referring now to the drawings, more particularly FIGS. 1 and 6, the present invention will be seen to comprise a steering control mechanism, generally designated 1, located for the most part within the passenger compartment 2 of a wheeled motor vehicle. The control mechanism includes a side-stick or hand grip assembly 3 preferably disposed along the longitudinal centerline of the vehicle such that the hand grip assembly 3 is positioned to the right of the normal left hand driver's seat position. The assembly 3 is mounted for lateral arcuate displacement in a single substantially vertical plane such that this pivotal displacement is transmitted, by a suitable motion transmitting train 4, through the firewall 5 and to an appropriate steering gear box 6 within the engine compartment. The output shaft 7 of the gearbox 6 in turn drives a power-assisted steering device 8. Both the gearbox 6 and steering device 8 may be of any suitable well-known construction, it being understood that the instant invention is directed to the control mechanism 1 for regulating the turning of the vehicle front wheels as accomplished by the steering device 8. Thus, the gearbox 6 and steering device 8 will be referred to as the steering actuation mechanism 9 and may include well-known components such as hydraulic fluid pump, radius arms, tie-rod, etc.

In the embodiment of FIG. 1, the motion transmitting train or interconnection means 4 of the steering control mechanism 1 will be seen to include a purely mechanical subsystem comprising a plurality of shafts having their respective ends joined by suitable universal joints 10. The rearmost shaft 11 is directly attached to the stick assembly 3 and is appropriately supported in a radially and longitudinally fixed position by means of a plurality of pillow blocks or mounts 12 suitably affixed relative the vehicle body or frame. Thus, the shafts may extend above or below the floorboard. Each mount 12 carries an appropriate bearing 13 supporting the shaft 11 for rotation therein. The necessary number of shafts continue forwardly with the frontmost shaft 14 in the passenger compartment 2 passing through the vehicle firewall 5 to directly connect with the steering actuating mechanism 9 such as shown in FIG. 6 of the drawings.

Figure 2:
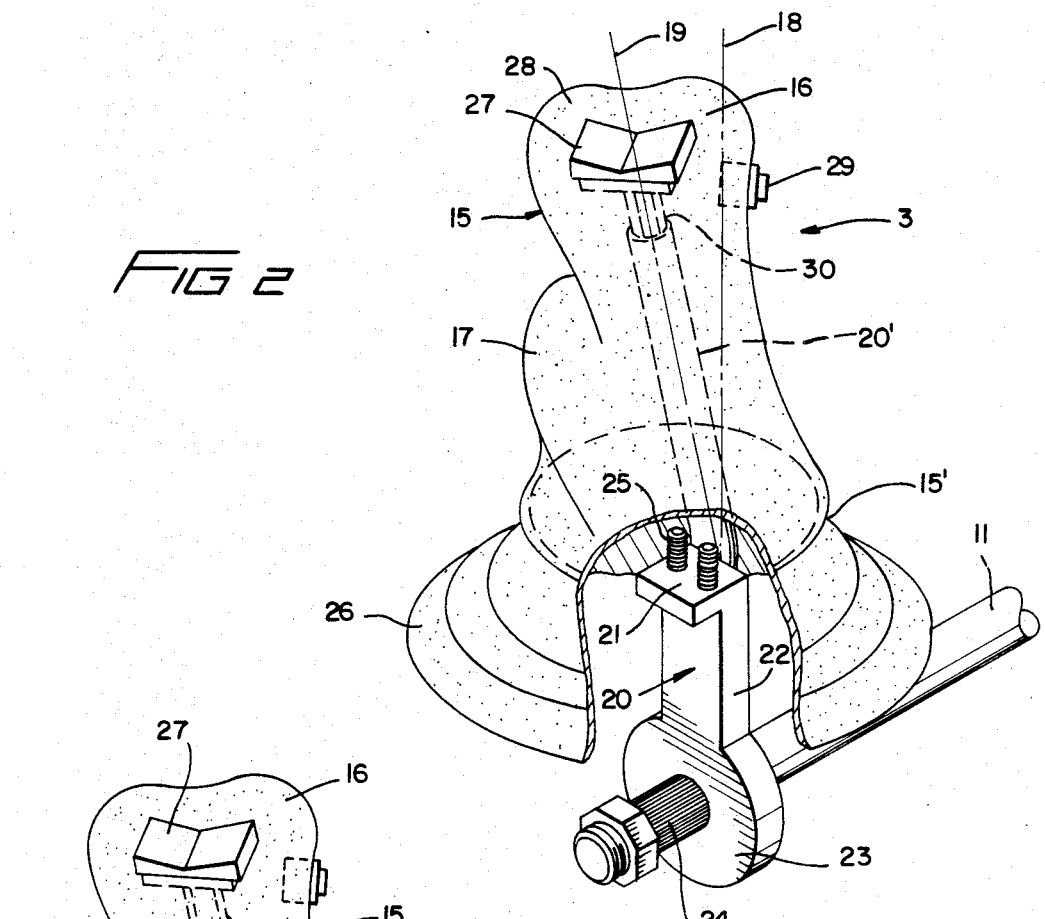
FIG. 2 is an enlarged perspective view of the side-stick shown in FIG. 1.

The details of the hand grip assembly 3 will be more clearly seen from a review of FIG. 2. This side-stick assembly includes a handle 15 which is suitably contoured to provide that most natural comfort to the average driver and includes an uppermost portion 16 from which projects a lower, lateral thumb rest portion 17. Since the stick assembly 3 is positioned to the right of and slightly forward of the driver's position, the vertical center axis of the handle 15 is preferably canted slightly to the left of the vertical axis 18 such that its longitudinal axis is disposed approximately 12 degrees left of the axis 18 as depicted by the inclined axis 19 in FIG. 2 of the drawings. The handle 15 is rigidly affixed with respect to the rear end of the shaft 11 by means of the standard 20. The standard includes a horizontal platform 21 positioned at the top of an upright 22 the latter of which is affixed at the 12 o'clock position, to a collar mount 23. In the normal, at-rest position, when the vehicle is being driven in a straight line direction, the standard 20 is aligned with the vertical axis 18. Also attached to the standard is a metal tube 20' which will be seen to be aligned along the canted axis 19, one purpose of which is to serve as a mount for the surrounding sculptured hand grip 15. The mount 23 is suitably affixed with respect to the rear end of the shaft 11 such as by the illustrated splines 24 so that arcuate lateral displacement of the standard 20 in either direction from the vertical axis 18, produces a corresponding arcuate displacement or rotation of the motion transmitting train 4.

The side-stick handle 15 is rigidly attached to the standard and tube 20—20' by means of removable fasteners 25 passed through the platform 21. A flexible boot 26 serves to enclose the space between the bottom of the handle 15 and the top surface of the adjacent console 27', beneath which the motion transmitting train 4 is enclosed. A peripheral groove 15' adjacent the bottom of the handle 15 serves to captively retain the top of the boot 26.

Since the present system eliminates the conventional steering wheel and shaft, convenient alternative means must be provided to permit operation of the vehicle horn, lights and other accessories previously controlled from switches, button or levers found on existing steering wheels and steering wheel shafts. Accordingly, a two-position rocker switch 27 is mounted in the top 28 of the handle 15 for operation of the vehicle turn signals by the thumb of the driver. Any number of additional push button or other type switches 29 may be carried by the handle 15 for operation of other accessories such as the horn, headlights, windshield wipers, etc. An appropriate wiring harness 30 fed to the various switches through the interior of the metal tube 20' supplies the required electrical circuits for the various switches mounted on the handle.

With the foregoing described structure in mind, it will be understood that steering of the vehicle front wheels (not shown) is readily accomplished with the driver's right hand grasping the handgrip assembly handle 15 and merely pivoting same to the left or right of the handle axis 19 in order to produce a left or right hand rotation of the interconnecting means 11, 12. This mechanical displacement directly controls operation of the gearbox 6 of the steering actuation mechanism 9. As a result of this input to the gearbox 6, its output shaft 7 is correspondingly rotated to impart operation of the power-assisted steering device 8 such that its two steering members 31—31 are appropriately displaced to manipulate the radius arms (not shown) and/or other elements conventionally associated with steering the wheels of a vehicle. As in conventional steering wheel systems, the amplitude of the side-stick arcuate displacement determines the radius of turn of the vehicle and holding the handle 15 at any displaced position will maintain a selected turn radius whereafter, centering of the handle centers the vehicle wheels.

Figure 3:
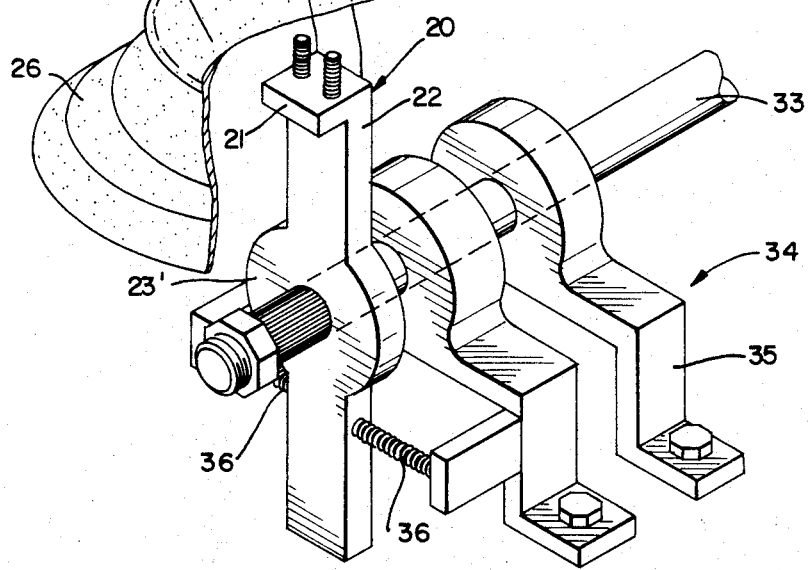
FIG. 3 is a perspective view of an alternative side-stick assembly.
Figure 5:
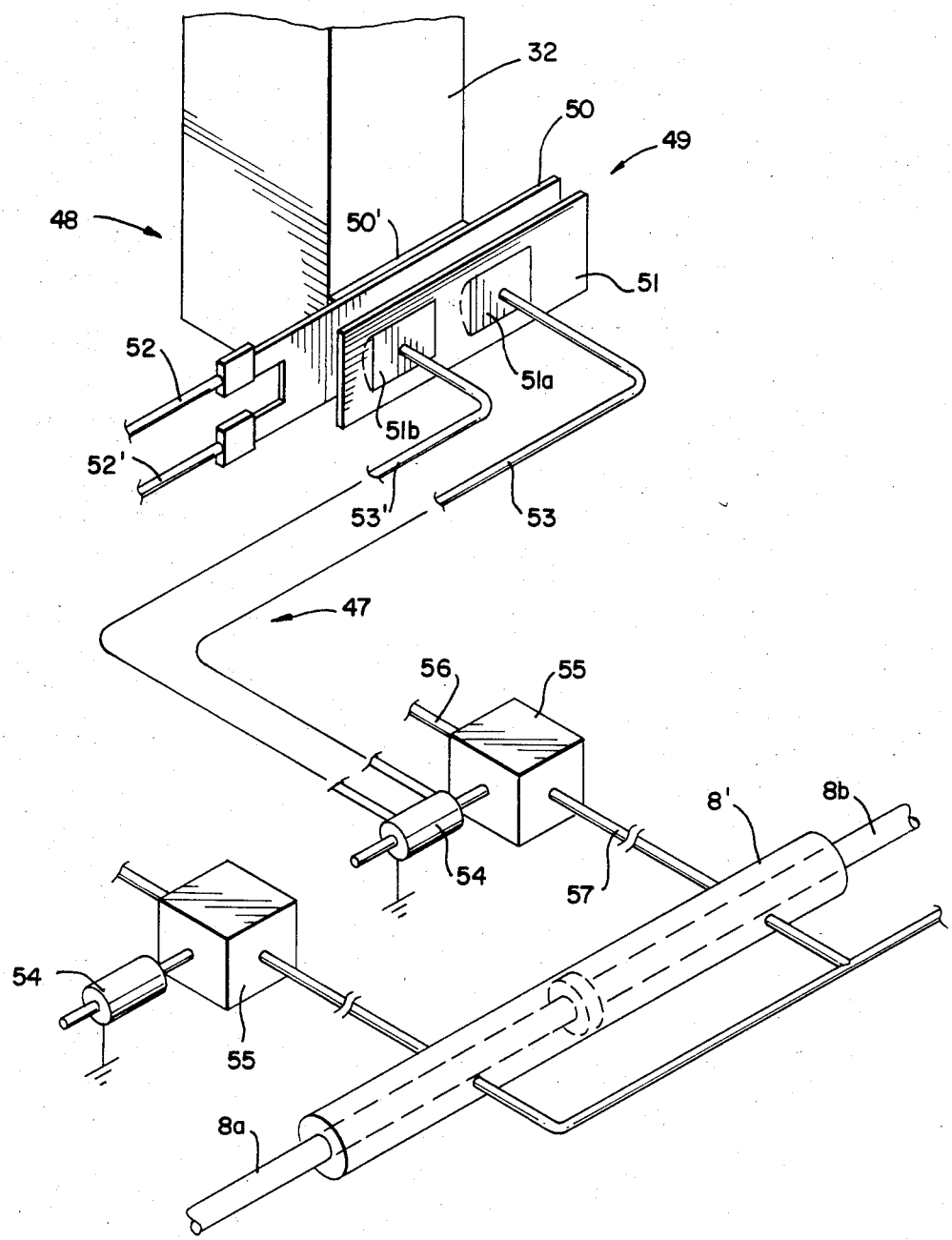
FIG. 5 is a view similar to FIG. 4 and illustrates a further alternative form of interconnection means.

FIGS. 3, 4 and 5 of the drawings illustrate alternative embodiments utilizing either an electrical or hydraulic motion transmitting train in lieu of the direct mechanical arrangement as shown in FIG. 1. In both the hydraulic sub-system of FIG. 4 and the electrical sub-system of FIG. 5, actuation of the motion transmitting train is accomplished by means of an actuating arm 32 affixed to and extending downwardly from the 6 o'clock position of the handgrip assembly collar mount 23'. This collar mount 23' is attached to a horizontal shaft 33 in turn mounted within a support assembly 34 fixed relative the vehicle body or frame. Support assembly 34 includes a plurality of legs 35 at least two opposed ones of which provide an anchor for spring elements 36—36 engaging opposite sides of the actuating arm 32. In this manner, the actuating arm 32, as well as the uppermost handgrip assembly 3 will be seen to be maintained normally in a neutral or vertical disposition whereupon positive force must be applied to the handle 15 to pivot same to either side of the vertical axis 18 It will be apparent that a similar or equivalent centering arrangement may be provided for the handgrip assembly in the embodiment of FIG. 1, in order to provide a neutral or at-rest position for the steering control mechanism 1 although not usually required in view of the self-centering action inherent with mechanically interconnected systems.

The steering control mechanism, generally designated 37 in FIG. 4, is preferably located beneath the floorboard and utilizes a hydraulic motion transmitting train 38 to actuate a power-assisted steering device such as 8' (FIG. 5) controlling the steering of the vehicle wheels. This hydraulic sub-system includes a hydraulic fluid line or loop 39 extending from each side of the steering device 8' and will be understood to be disposed in series with a power-steering pump (not shown). With this arrangement, any control of the passage of hydraulic fluid within the line 39 will be understood to directly affect the operation of the associated steering device 8'. For purposes of clarity, only one hydraulic line 39 is shown in the drawings, yet it will be understood that a separate, duplicate hydraulic line 39 will be disposed adjacent the opposite side of the hand grip assembly actuating arm 32. Each fluid line 39 is provided with a valve housing 40 adjacent one side of the actuating arm and includes a sliding gate valve arrangement therewithin. This, the line 39 includes an opening 41 within the housing 40 within which a sliding valve gate or plate 42 is disposed. This gate will be seen to be formed with a valve opening 43 as well as a piston or gate extension 44 projecting from the housing 40 toward the actuating arm 32. The free end of the extension carries a contact shoe 45 and the entire sliding gate 42 is normally urged by a spring 46 within the valve housing 40 into engagement with the actuating arm 32.

With the understanding that the above-described construction is provided adjacent both sides of the handgrip assembly actuating arm 32, it will be seen that upon pivotal manipulation of the handle 15, the lower end of the actuating arm 32 will displace the respective valve gate 42 to progressively and incrementally allow hydraulic fluid under pressure to move from the input section 39' of the hydraulic line to and through the output section 39" thereof. This progressive passage of hydraulic fluid will be apparent in view of the circular configuration of the gate valve opening 43 and cooperating cross section of the hydraulic line 39 within the valve housing 40. In this manner, it will be appreciated that a realistic response to the steering action as provided by the power-assisted steering device 8' is achieved since a greater pivotal displacement of the handgrip assembly 3 along with the greater pivotal displacement of its attached actuating arm 32 will allow an increasingly greater amount of fluid under pressure to pass from the first section 39' of the hydraulic line into the second section 39" thereof and thence to the steering device 8'.

In the embodiment of FIG. 5 of the drawings, an electrical motion transmitting train 47 is depicted, and instead of utilizing the hydraulic control mechanism 37 as in FIG. 4, a steering control mechanism 48 is provided which includes an electrical switch assembly 49, again duplicated to either side of the intermediately disposed handgrip assembly actuating arm 32. Each electrical switch assembly 49 includes an electrical bus contact 50 carried by the actuating arm 32 and which is adapted to be moved into engagement with a fixed switch element 51. Suitable dielectric 50' isolates the contact 50 from its attached actuating arm 32 while connections or wiring 52 and 52' provide primary and backup sources of electrical power. The switch element 51 comprises dielectric supporting contacts 51a, 51b respectively joined by wires 53, 53' completing a circuit leading to a solenoid 54 associated with a gate valve 55 which may be identical to the structure shown in the valve housing 40 of FIG. 4. The primary distinction offered by the embodiment of FIG. 5 is that remote steering control is achieved by means of electrical signals which regulate power-steering fluid flow fully within the engine compartment as opposed to the arrangement of FIG. 4 wherein this fluid flow regulation is obtained adjacent the handgrip assembly.

With the above arrangement, closing of the contacts of either switch assembly 49, activates a respective solenoid 54 to progressively open or close the valve gate contained in the valve housing 55 such that the pressure and flow of the hydraulic fluid through the input line 56 to the output line 57 is regulated. This regulated hydraulic flow serves to operate the power assisted steering device 8' as in the previously described embodiment whereby the rods 8a, 8b are driven to move the associated radius rods etc. to steer the vehicle wheels.

In both the embodiments of FIGS. 4 and 5, backup sub-systems may be provided. In the case of FIG. 4, duplicate, independent fluid lines may be used should a rupture occur in any one line. With the sub-system of FIG. 5, if the primary circuit of FIG. 5 should fail, such as upon alternator break-down, automatic switching can bring into play current to the wire 52' from a storage battery so that steering control will still be possible.

I claim:

1. A vehicle steering system, for regulating the operation of a steering actuating mechanism including a power-assisted steering device adapted to manipulate the steering direction of the wheels of a vehicle including; a steering control mechanism comprising a handgrip assembly mounted for angular displacement to one side of a driver's position in a passenger compartment of the vehicle, an interconnection means extending from said handgrip assembly to an engine compartment of the vehicle whereby angular displacement of said handgrip assembly is transmitted to said steering actuating mechanism by said interconnection means to manipulate said power-assisted steering device;

wherein said handgrip assembly includes a standard pivotally attached to fixedly disposed mounting means, a handle secured to said standard, and said handle and standard being pivotally displaceable about said mounting means in a plane substantially normal to the longitudinal centerline of the vehicle; and wherein said interconnection means includes a hydraulic motion transmitting train comprising two separate fluid lines each provided with a valve housing disposed adjacent said handgrip assembly, an actuating arm depending from and fixed relative said handle, said actuating arm disposed intermediate said two valve housings, and a movable valve element projecting from each said valve housing and respectively engageable to regulate flow of fluid through said lines as said handle and actuating arm are angularly displaced.

2. A vehicle steering system according to claim 1 including a gate valve attached to said movable valve element within each said valve housing.

3. A vehicle steering system for regulating the operation of a steering actuating mechanism including a power-assisted steering device adapted to manipulate the steering direction of the wheels of a vehicle including; a steering control mechanism comprising a handgrip assembly mounted for angular displacement to one side of a driver's position in a passenger compartment of the vehicle, an interconnection means extending from said handgrip assembly to an engine compartment of the vehicle whereby angular displacement of said handgrip assembly is transmitted to said steering actuating mechanism by said interconnection means to manipulate said power-assisted steering device;

wherein said handgrip assembly includes a standard pivotally attached to fixedly disposed mounting means, a handle secured to said standard, and said handle and standard being pivotally displaceable about said mounting means in a plane substantially normal to the longitudinal centerline of the vehicle; and wherein said interconnection means includes an electric motion transmitting train comprising two separate electrical circuits each provided with a switch assembly disposed adjacent said handgrip assembly, an actuating arm depending from and fixed relative said handle, said actuating arm disposed intermediate said two switch assemblies, each said switch assembly having a first element carried by said actuating arm and a fixed second element normally spaced apart from said first element, two fluid controlling valve means regulating operation of said power-assisted steering device to respectively direct the vehicle wheels to the left and right, and one of each said electrical circuits joining one said switch assembly to one said valve means whereby angular displacement of said handle and actuating arm respectively closes one said switch assembly to actuate one said valve means.

4. A vehicle steering system according to claim 3 wherein each said first element comprises a bus contact provided with an additional independent electrical circuit and each said second element includes a pair of fixed contacts simultaneously engaged by said first element when said actuating arm is displaced thereto whereby each said electrical circuit and additional electrical circuit may be supplied with current from alternate sources to provide backup operation of said system.

5. A vehicle steering system according to claim 3 including a fluid line leading to said power-assisted steering device, each said valve means provided with a gate valve, and a solenoid connected to each said gate valve.

* * * * *